US011305989B2

(12) United States Patent
Ryan et al.

(10) Patent No.: US 11,305,989 B2
(45) Date of Patent: Apr. 19, 2022

(54) CATALYTIC HYDROGEN PRODUCTION

(71) Applicant: University of Massachusetts, Boston, MA (US)

(72) Inventors: David K. Ryan, Reading, MA (US); T. A. Mahesh Jayamanna, Lowell, MA (US)

(73) Assignee: University of Massachusetts, Boston, MA (US)

( * ) Notice: Subject to any disclaimer, the term of this patent is extended or adjusted under 35 U.S.C. 154(b) by 168 days.

(21) Appl. No.: 16/495,548

(22) PCT Filed: Mar. 20, 2018

(86) PCT No.: PCT/US2018/023380
§ 371 (c)(1),
(2) Date: Sep. 19, 2019

(87) PCT Pub. No.: WO2018/175452
PCT Pub. Date: Sep. 27, 2018

(65) Prior Publication Data
US 2020/0095123 A1 Mar. 26, 2020

Related U.S. Application Data

(60) Provisional application No. 62/473,756, filed on Mar. 20, 2017.

(51) Int. Cl.
*C01B 3/10* (2006.01)
*B01J 23/75* (2006.01)
*B01J 27/232* (2006.01)
*B01J 35/00* (2006.01)
*B01J 37/16* (2006.01)

(52) U.S. Cl.
CPC .................. *C01B 3/10* (2013.01); *B01J 23/75* (2013.01); *B01J 27/232* (2013.01); *B01J 35/0013* (2013.01); *B01J 37/16* (2013.01)

(58) Field of Classification Search
CPC .......... C01B 3/10; C01B 3/06; B01J 35/0013; B01J 27/232; B01J 23/75; B01J 37/16
See application file for complete search history.

(56) References Cited

U.S. PATENT DOCUMENTS

| 3,975,217 A | 8/1976 | Kunda et al. |
| 4,808,233 A | 2/1989 | Pfannkoch |
| 2013/0039846 A1* | 2/2013 | Fukai ........................ C01B 3/10 423/657 |

(Continued)

FOREIGN PATENT DOCUMENTS

WO  WO-2018175452 A1  9/2018

OTHER PUBLICATIONS

Wang et al. "Using metal nanostructures to form hydrocarbons from carbon dioxide, water and sunlight" AIP Advances 1, 042124 (2011) (Year: 2011).*

(Continued)

*Primary Examiner* — Steven J Bos
*Assistant Examiner* — Syed T Iqbal
(74) *Attorney, Agent, or Firm* — Schwegman Lundberg & Woessner, P.A.

(57) ABSTRACT

The present disclosure provides a method of producing hydrogen. The method includes heating a mixture comprising a metal component exhibiting a nanostructured surface, water, and carbon dioxide.

19 Claims, 3 Drawing Sheets

(56) References Cited

U.S. PATENT DOCUMENTS

2013/0153860 A1 6/2013 Kim et al.
2014/0309102 A1 10/2014 Basile et al.

OTHER PUBLICATIONS

Michiels et al. Production of hydrogen gas from water by the oxidation of metallic iron under mild hydrothermal conditions, assisted by in situ formed carbonate ions Fuel 160 (2015) 205-216 (Year: 2015).*
"International Application Serial No. PCT/US2018/023380, International Search Report dated Jun. 6, 2018", 2 pgs.
"International Application Serial No. PCT/US2018/023380, Written Opinion dated Jun. 6, 2018", 4 pgs.
Jayamanna, "Abiotic photosynthetic production of alkanes using nanostructured Co, Ni and Fe catalysts with C02 and water in the presence of visible light and catalytic production of H2 with nanostructured Co particles, University of Massachusetts Lowell", Ph.D. Dissertation, (retrieved on May 11, 2018]. Retrieved from the Internet: <URL: https://search.proquest.com/docview/1864628684?pq-origsite=gscholar>, (Nov. 2016), 18-22,93-107.

* cited by examiner

CATALYTIC HYDROGEN PRODUCTION

PRIORITY APPLICATION

This application is a U.S. National Stage Filing under 35 U.S.C. 371 from International Application No. PCT/US2018/023380, filed on Mar. 20, 2018, which claims priority to U.S. Provisional Application Ser. No. 62/473,756, filed Mar. 20, 2017, the disclosures of which are incorporated herein in their entirety by reference.

BACKGROUND

Hydrogen is considered to present opportunities for environmentally friendly energy production. One of the challenges associated with using hydrogen as an energy carrier is the efficient production of hydrogen. It would be desirable to establish simple protocols for the production of acceptably pure hydrogen.

SUMMARY OF THE DISCLOSURE

The present disclosure provides a method of producing hydrogen. The method includes heating a mixture comprising a metal component exhibiting a nanostructured surface, water, and carbon dioxide or carbonate.

The present disclosure further provides a kit for producing hydrogen. The kit includes a mixture having a metal component exhibiting a nanostructured surface, a quantity of water, and a quantity of carbon dioxide.

There are several advantages associated with various embodiments of the method and kit of the present disclosure, some of which are unexpected. For example, according to various embodiments of the present disclosure, hydrogen gas of high purity can be obtained. Additionally, according to various embodiments of the present disclosure, a metal or metal compound with a synthesized nanostructured surface can be an important component for hydrogen production. According to various embodiments of the present disclosure, the metal or metal compound with a synthesized nanostructured surface can help to produce hydrogen of a higher purity than a corresponding metal component that has a nanostructured surface formed from acid, base, or laser etching. For example, according to various embodiments of the present disclosure a purity of the hydrogen produced ranges from about 20% (V/V) to about 98% (V/V). Other advantages, according to various embodiments of the present disclosure include a total lack of, or any significant amount of, carbon monoxide (CO) produced that might act as a poison if the hydrogen is used in fuel cells. According to various embodiments of the present disclosure, there is potential for continuous production of hydrogen with a flow through reactor. According to various embodiments of the present disclosure, a method or system including the metal employs commonly available feedstocks (e.g., water, carbon dioxide, and cobalt) and is substantially free of highly toxic materials and does not produce toxic waste materials. According to various embodiments of the present disclosure, systems and methods using the metal do not require high temperatures or pressures. According to various embodiments of the present disclosure cobalt can be recycled for reuse in the reaction system.

BRIEF DESCRIPTION OF THE FIGURES

The drawings illustrate generally, by way of example, but not by way of limitation, various embodiments discussed in the present document.

DETAILED DESCRIPTION

Figure 1A:
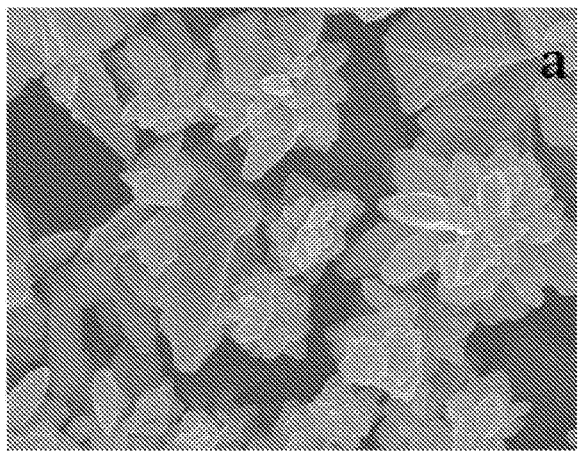
FIGS. 1A-1D are SEM images of synthesized nanostructured cobalt particles at four different magnifications: (a) 20,000×, (b) 15,000×, (c) 8,000×, and (d) 2,200×.
Figure 1B:
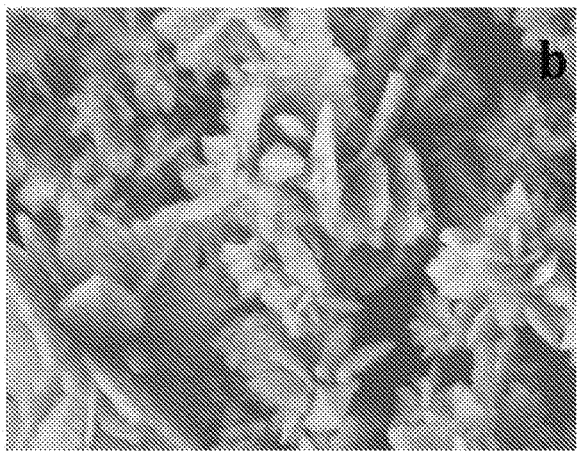
Figure 1C:
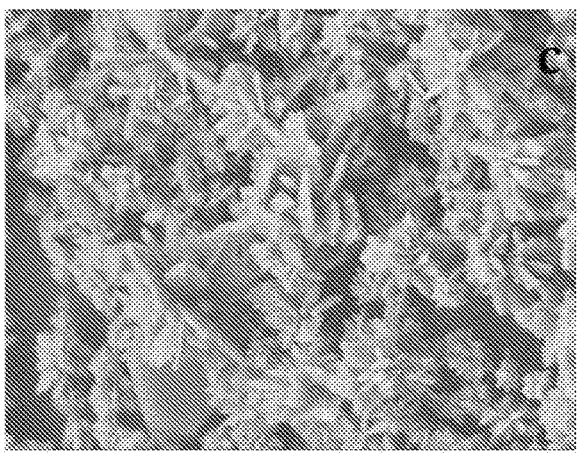
Figure 1D:
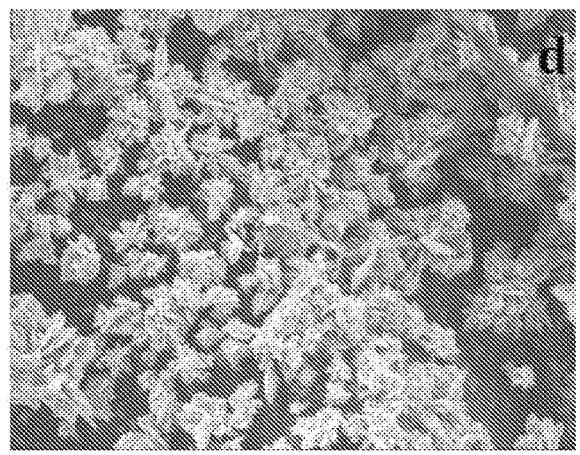

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

In the search for sustainable cleaner energy carrier, hydrogen is considered as an intriguing future energy carrier, overcoming the environmental impact and sustainability issues associated with fossil fuels. Photocatalytic splitting of water has drawn major attention in the low-cost production of hydrogen with the use of sunlight as the energy source. One way to accomplish the photocatalytic splitting of water is with a $TiO_2$ based photocatalyst. The band gap of $TiO_2$ (3.2 eV) requires the use of ultraviolet (UV) light in the photodissociation of water, even though the energy required to dissociate water (1.23 V) can be provided by infrared (IR) radiation. Photocatalysts developed in recent decades show greater efficiency with UV light compared to the photocatalysts developed for work under visible light. Because solar radiation contains only about 4% UV light, recent research has paid much attention to the development of photocatalysts that harness visible light, which has a 43% solar radiation contribution.

This disclosure can provide a system or method for producing higher hydrogen purity levels. As described further herein, the gaseous phase in the reactors used for hydrogen production was internally monitored in the identification of various gaseous intermediates and products. In some examples, the amount of $H_2$ produced in the reactions was about 30.5% (v/v) of $H_2$ or even 98.4%. Hence, the disclosed reaction setup was useful for generating hydrogen to feed a fuel cell for the production of cleaner energy with a sustainable energy source. The absence or limited amount of CO production with produced $H_2$ can be beneficial since even a small amount of CO present in the $H_2$ stream (few parts per million) can lead to the poisoning of Pt anodes in fuel cells causing a large loss of efficiency. As disclosed herein, the production of $H_2$ can proceed free of irradiation.

According to various embodiments of the present disclosure, a method of producing hydrogen includes disposing a metal component exhibiting a nanostructured surface, a quantity of carbon dioxide, and water in a reaction vessel. Once the components are disposed in the reaction vessel, the pH of the vessel is brought to basic conditions the temperature of the reaction vessel is increased. The reaction vessel can be a stainless steel or glass container that is configured to allow or block the transmission of light into the reaction vessel.

Various components used in conjunction with the method can account for different quantities of the composition in the reaction vessel. For example, the quantity of the metal component in the reaction vessel can be in a range from about 0.3 g to about 100 kg. However, the amount of the metal component can be any suitable amount for production of different quantities of $H_2$. The metal component can include an elemental metal or alloy thereof. In some examples the metal component can include a metal oxide. The elemental metal or alloy thereof can be in a range from about 0.01 wt % to about 100 wt % of the metal component, about 80 wt % to about 100 wt %, 95 wt % to about 100 wt %, or less than, equal to, or greater than about 0.01 wt %, 0.5, 1, 10, 20, 30, 40, 50, 60, 70, 75, 80, 85, 90, 95, or 100 wt %.

The metal component can include one or more metals or alloys thereof. For example, the metal component can include at least one of the elements Co, Ti, Ru, Rh, Pd, Os, Ir, La, Ce, Fe, Cu, and Ni or an alloy thereof. In various embodiments the metal component can include substantially 100 wt % cobalt or an alloy thereof.

The metal component can act to initiate and maintain the formation of the hydrogen in some embodiments. Without intending to be bound to any theories, the inventors believe that the formation of the nanostructured surface on the metal component contributes to the formation of the hydrogen. The nanostructured surface can have a plurality of features having any suitable configuration. As shown in FIGS. 1A-1D, each of the plurality of features of the nanostructured surface has a nanoleaf configuration. Each of the features can have different nanoscale dimensions. For example, each of the nanostructures can have the following dimensions: about 1 nm to about 1,000 nm in length, about 1 nm to about 1,000 nm in height, and about 1 nm to about 1,000 nm in thickness.

The metal component is synthesized through a chemical process. This is a so called "bottom up" approach in that the nanostructured surface is formed through a chemical process building nanomaterials from molecules, ions or metal atoms. This is directly contradictory to other examples of metal components, which include nanostructured surfaces formed through chemical or laser etching techniques—so called "top down" approaches. Examples of metal components made through top-down approaches are described in United States Published Patent Application No. 2012/0097521 to ("Shen").

The nanostructured surface of the metal component formed through a top-down approach is different than those of a metal component formed from a bottom-up approach. As can be seen in FIGS. 1A-1D, the nanostructured surface of the metal components have a nanoleaf structure. In contrast, the nanostructured surface of the metal components of Shen, formed by acid, base, or laser etching have a nanospike or nanoflake structure.

The nanostructured surface of the metal component of the instant disclosure is formed by reacting a metal salt with a reducing agent. The metal can be any one of the metals described herein. The anion can be any suitable anion such as chloride, bromide, iodide, fluoride, nitrate, sulfide, sulfate, perchlorate and the like. In examples where the metal is cobalt, the salt can be at least one of $CoCl_2$, $Co(NO_3)_2$, $CoSO_4$, and mixtures thereof. The reducing agent can be one of many suitable reducing agents such as $N_2H_4$, $N_2H_4 \cdot H_2O$, $NaBH_4$, sodium dithionite, sodium hypophosphite, lithium aluminum hydride, tin (II) salts, hydrogen, and mixtures thereof.

After the nanostructured surface of the metal component is formed, the metal component can be "aged" for a period of time before use in the hydrogen producing reaction. The metal component can be aged for any suitable amount of time. For example, the metal component can be aged for a time ranging from about 1 day to 15 days, 2 days to 10 days, less than, equal to, or greater than 1 day, 2, 3, 4, 5, 6, 7, 8, 9, or 10 days. The metal component can be aged for example in an oven under vacuum or in the presence or absence of oxygen.

The amount of each component in the reaction vessel can be selected from many suitable amounts. Generally, the amount of each component can depend on the size of the reaction vessel or the amount of hydrogen to be produced.

The carbon dioxide is supplied to the reaction vessel as a gas. The pressure of the carbon dioxide in the reaction vessel can be in a range from about atmospheric pressure or 0 psi above ambient to about 250 psi, about 15 psi to about 50 psi, about 20 psi to about 40 psi, less than, equal to, or greater than about, 10 psi, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 200, 205, 210, 215, 220, 225, 230, 235, 240, 245, or 250 psi.

The amount of water in the reaction vessel can be any appropriate amount. While not so limited, the quantity of the water in the reaction vessel can range from about 200 µL to about 5000 µL, about 500 µL to about 1000 µL, less than, equal to, or greater than about 200 µL, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2000, 2050, 2100, 2150, 2200, 2250, 2300, 2350, 2400, 2450, 1500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, or 5000 µL. The wt % of the water relative to the other components can range from about 0.01 wt % to about 60 wt %. Additionally, the water can be continuously introduced in the reaction vessel.

In addition to the components described herein, other components can be added to the reaction vessel. It can be desirable to keep the pH within the reaction vessel above 7.

Once the components are in the reaction vessel, the temperature of the vessel is increased. The temperature of the reaction vessel can be increased to a temperature ranging from about 100° C. to about 350° C., about 130° C. to about 170° C., less than, equal to, or greater than 100° C., 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, or 350° C.

With all the components present and the temperature increased, the reaction begins. The reaction can be allowed to proceed continuously or for any suitable finite amount of time. For example, a quantity of the metal component can be placed in a reactor. Water and carbon dioxide can be continuously supplied to the reactor. The continuous supply of water and carbon dioxide to the metal component in the reactor can produce a stream of $H_2$. This process can be configured to run for any suitable amount of time. For example, the reaction can run for a time period ranging from about 0.5 hours to about 100 hours, about 20 hours to about 94 hours, about 60 hours to about 80 hours, less than, equal to, or greater than 0.5 hours, 5, 10, 15, 20, 25, 30, 35, 40, 45, 50, 55, 60, 65, 70, 75, 80, 85, 90, 95, or 100 hours. Additionally, longer times are contemplated within the scope of this disclosure.

Without intending to be bound to any theory, the inventors believe that the production of hydrogen is driven by the thermal decomposition of water with the oxidation of the metal component having the nanostructured surface as catalyzed by the carbon dioxide. The production of hydrogen may be explained by the reactions below in which the metal component includes cobalt:

$CO_2(g) + H_2O(l) = H_2CO_3(aq)$ $H_2CO_3(aq) + 2NaOH(aq) = Na_2CO_3(aq) + 2H_2O(l)$ (pH of NaOH=14)

$Na_2CO_3(aq) + Co(s) + 2H_2O(l) = CoCO_3(s) + H_2(g) + 2NaOH(aq)$ $3CoCO_3(s) + H_2O(l) = Co_3O_4(s) + H_2(g) + 3CO_2(g)$

A purity of the hydrogen produced from the reaction ranges from about 20% (v/v) to about 99% (v/v), 25% (v/v) to about 35% (v/v), less than, equal to, or greater than 20% (v/v), 25, 30, 35, 40, 45 50, 55, 60, 65, 70, 75, 80, 85, 90, 95, or 99% (v/v). The inventors have found that the purity of the hydrogen produced by the methods described herein, using the metal component including the nanostructured surface formed from the bottom-up procedures is greater than that of hydrogen produced according to a corresponding method wherein the metal component exhibiting a nanostructured surface is produced by acid etching, base etching, or laser etching, or no etching.

The methods described herein can be carried out by individually adding each component to the reaction vessel. In further embodiments, however, a kit including the metal component, water, and carbon dioxide can be produced and the reaction can be triggered by increasing the temperature of the kit.

EXAMPLES

Various embodiments of the present disclosure can be better understood by reference to the following Examples which are offered by way of illustration. The present disclosure is not limited to the Examples given herein.

Example 1.1 Materials

In the synthesis of the nanostructured cobalt metal component, $CoCl_2 \cdot 6H_2O$ (J. T. Baker), hydrazine monohydrate, 98+% (Alfa Aesar) and NaOH were used. Deionized water (18.2 MΩ, Elga, Purelab-Option Q) was used in all the synthesis steps. Except where noted, all chemicals were analytical reagent grade and used without further purification.

Experiment 1.2 Synthesis of Nanostructured Cobalt Particles

The synthesis was an aqueous phase reduction of $CoCl_2 \cdot 6H_2O$ with excess hydrazine hydrate in a basic medium. The stoichiometric reaction in the reduction of $Co^{2+}$ to Co metal with hydrazine is given below.

$$2Co^{2+}_{(aq)} + N_2H_{4(aq)} + 4OH^-_{(aq)} \rightarrow 2Co_{(s)} + N_{2(g)} + 4H_2O_{(l)} \quad (3)$$

In order to obtain nanostructures on the synthesized Co particles, excess hydrazine and NaOH were used by modifying the above stoichiometric ratio as shown below.

$$CoCl_2 \cdot 6H_2O + 8NaOH + 10N_2H_4 \cdot H_2O \quad (4)$$

Dissolved $CoCl_2 \cdot 6H_2O$ in water is reddish pink in color. After introducing excess hydrazine and NaOH, a vigorous reaction occurs overflowing the reaction vessel.

In the synthesis of the nanostructured cobalt, a mixture of NaOH and $N_2H_4 \cdot H_2O$ was prepared with concentrations of 5.44 M and 17.01 M, respectively. A 25.0 mL portion of the NaOH/$N_2H_4$ mixture was added to 50 mL of 0.34 M $Co^{2+}$ solution while stirring the reaction mixture at 400 rpm and maintaining the temperature at 80° C. After about 45 minutes, the cobalt particles were collected by holding a magnet on the outside wall of the reaction flask and pouring off the reaction mixture. This was followed by washing the cobalt particles with deionized water. The cobalt particles were dried in a vacuum oven overnight at 70° C. before conducting experiments.

Example 2.1 Characterization of Nanostructured Cobalt Particles

Example 2.2 SEM Characterization

Scanning Electron Microscopy (SEM) images of the synthesized catalyst were taken using a JEOL JSM-7401F Field Emission Scanning Electron Microscope at 10.0-15.0 kV. Sharp features/nanostructures on the surface of the cobalt particles could be observed as shown in FIGS. 1A-1D.

Example 2.2 TEM Characterization

TEM characterization of the synthesized cobalt particles was done using a Philips EM400T transmission electron microscope at 100 kV. According to the TEM images, it could be observed that the bulk of the cobalt particles were irregular in shape and the size was in the micrometer range. The crystalline structure of the particles could be observed from the electron diffraction pattern.

Example 3.1 Hydrogen Production Experiments

In the experiments, the nature of the $H_2$ production reaction (photochemical or thermal), the effect of $CO_2$ and its pressure, the effect of pH in the reaction medium and other reaction parameters were studied for the optimum production of $H_2$.

The stainless steel reactor is basically a hollow metal cylinder, which is capped with a threaded plug at one end. The other end of the cylinder is sealed with a stainless steel threaded nut fitted with stainless steel tubing, which is connected to a pressure gauge. A T-connector in the stainless steel tubing allows pressurizing the reactor with a desired gas and sampling the gaseous products through a septum. Heating tape wrapped around the cylinder and connected to a controller, which regulates heating of the reactor to a desired temperature. The exact temperature of the reactor was measured with a thermocouple placed against the outside wall of the cylinder under the heating tape. After about 18 hours of reaction time, the gaseous phase of the reactor was analyzed by injecting 1 mL of gaseous sample into the Peak Performer-1$H_2$ and CO analyzer.

Dilutions of the injected samples were performed as necessary to stay within the calibration range.

Example 3.2 Optimization of Reaction Parameters

Reaction parameters (i.e. amount of water, $CO_2$ pressure, reaction time and pH of the reaction medium) were optimized to obtain higher conversion efficiencies for the production of $H_2$. The role of $CO_2$ in the production of $H_2$ was studied by carrying out experiments with Ultra High Purity (UHP) He and atmospheric gases as the pressurizing gas instead of $CO_2$.

Even though the production of $H_2$ was first detected when the reactors were pressurized with $CO_2$, the role of $CO_2$ in the final product of interest here (e.g., $H_2$) was not clear. Hence, the importance of $CO_2$ and its pressure in the reactor were evaluated. Four different experiments were carried out by changing the type of gas and its pressure as given in Table 1.

TABLE 1

Experimental conditions used in determining the role of $CO_2$ in $H_2$ production.

| Type of gas used | Pressure | Amount of water (μL) | Mass of catalyst (g) | Reaction time (hours) | Final temp (° C.) |
|---|---|---|---|---|---|
| $CO_2$ | 40 psi | 700 | 0.6012 | 19 | 116.5 |
| UHP He | 40 psi | 700 | 0.6080 | 19 | 116.5 |
| Air | 40 psi | 700 | 0.6061 | 19 | 116.5 |
| Air | 1 atm | 700 | 0.6081 | 19 | 116.5 |

Figure 2:
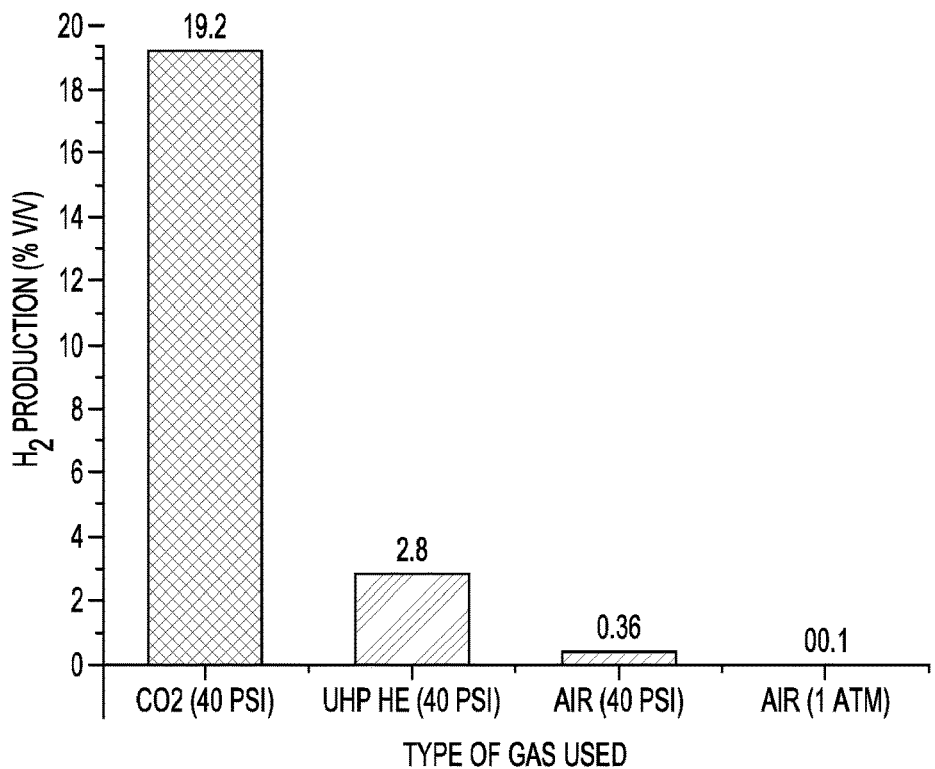
FIG. 2 is a graph showing amounts of produced $H_2$ with different gases at different pressures.

The amounts of $H_2$ produced in each experiment listed in Table 1 are given in FIG. 2. According to FIG. 2, it can clearly be seen that $CO_2$ and elevated pressure in the system play a major role in the production of $H_2$. When $CO_2$ was present in the system, the production of $H_2$ was the highest. The amounts of produced $H_2$ were higher at elevated pressure (air at 40 psi) compared to the lower pressure (air at 1 atm) in the system.

It is understood that the production of $H_2$ from water by the oxidation of zero valent iron particles under mild hydrothermal conditions is possible. In those instances, the $CO_2$ acts as a catalyst in the process for the production of $H_2$.

The formation of $CoCO_3$ in the reaction chambers could be visually noticed after about 18 hours with the appearance of pink islands on the black catalytic bed. The formation of $CoCO_3$ was further demonstrated by Thermo Gravimetric Analysis (TGA) by analyzing $CoCO_3$ standards and the cobalt catalyst before and after the thermal decomposition reaction.

According to the TGA data, the loss of weight at around 250° C. in the cobalt catalyst obtained after the reaction can be correlated with the loss of the weight in the $CoCO_3$ standard. The weight gain after about 300° C. in the cobalt catalyst used in the $H_2$ production can be correlated to the weight gain obtained with the freshly prepared cobalt catalyst. The weight gain of the cobalt catalyst at elevated temperatures may be due to the oxidation of the catalyst with trace amounts of $O_2$ present in the carrier gas as a contaminant. Hence, it is possible that some of the cobalt catalyst has converted to $CoCO_3$ in the $H_2$ production process. Since the two TGA curves obtained with $CoCO_3$ standards and with the cobalt catalyst used in the $H_2$ production process show different patterns of weight loss and temperature changes, further confirmation is necessary for the formation of $CoCO_3$.

The necessity of $CO_2$ in the production of $H_2$ was further confirmed by carrying out reactions at different pH values. The pH of water due to the dissolution of $H_2CO_3$ formed from water and $CO_2$ at 40 psi pressure was calculated as described below:

$$CO_{2(g)} \leftrightarrow CO_{2(aq)}$$

Applying Henry's Law $$P_{CO_2} \times K_H = [CO_2(aq)]$$

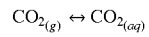  in the system = 40 psi − 14.70 psi $$= 25.29\ psi$$
$$= 1.72\ atm$$

$$1.72\ atm \times 3.4 \times 10^{-2} M/atm = [CO_2(aq)]$$

$$[CO_2(aq)] = 5.848 \times 10^{-2} M$$

Assuming all the $CO_2(aq)$ is in the form of $H_2CO_3$, $$H_2CO_3(aq) \leftrightarrow H^+(aq) + HCO_3^-(aq)$$

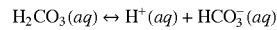

-continued $$2.65 \times 10^{-7} = \frac{[H^+(aq)]^2}{5.848 \times 10^{-2} - [H^+(aq)]}$$

$$[H^+(aq)] = 1.243 \times 10^{-4} M$$

$$pH = 3.90$$

Hence, the pH of water in the reactor reached around 3.90 due to the dissolution of $CO_2$ at 40 psi of $CO_2$ pressure. If the production of $H_2$ in the system is due to the low pH achieved with the dissolution of $CO_2$ and not due to the formation of $CoCO_3$, an experimental setup with pH adjusted to 3.9 should be able to produce the same amount of $H_2$ in the absence of $CO_2$. Hence, an experiment was carried out with the pH of the water adjusted to 3.91 and the system pressurized with ultra-high purity helium (UHP He) instead of $CO_2$. Two control experiments were carried out with water without adjusting the pH and pressurizing them with $CO_2$ and UHP He. The reaction conditions used in the three reactions are given in Table 2.

TABLE 2

Reaction conditions used for experiments to determine the role of $CO_2$ on the pH of the system.

| Type of gas used | Pressure | Amount of water (μL) | pH of water | Reaction time (hours) | Final temp (° C.) |
|---|---|---|---|---|---|
| UHP He | 40 psi | 700 | 3.915 | 17.5 | 86 |
| $CO_2$ | 40 psi | 700 | 6.043 | 17.5 | 86 |
| UHP He | 40 psi | 700 | 6.043 | 17.5 | 86 |

Figure 3:
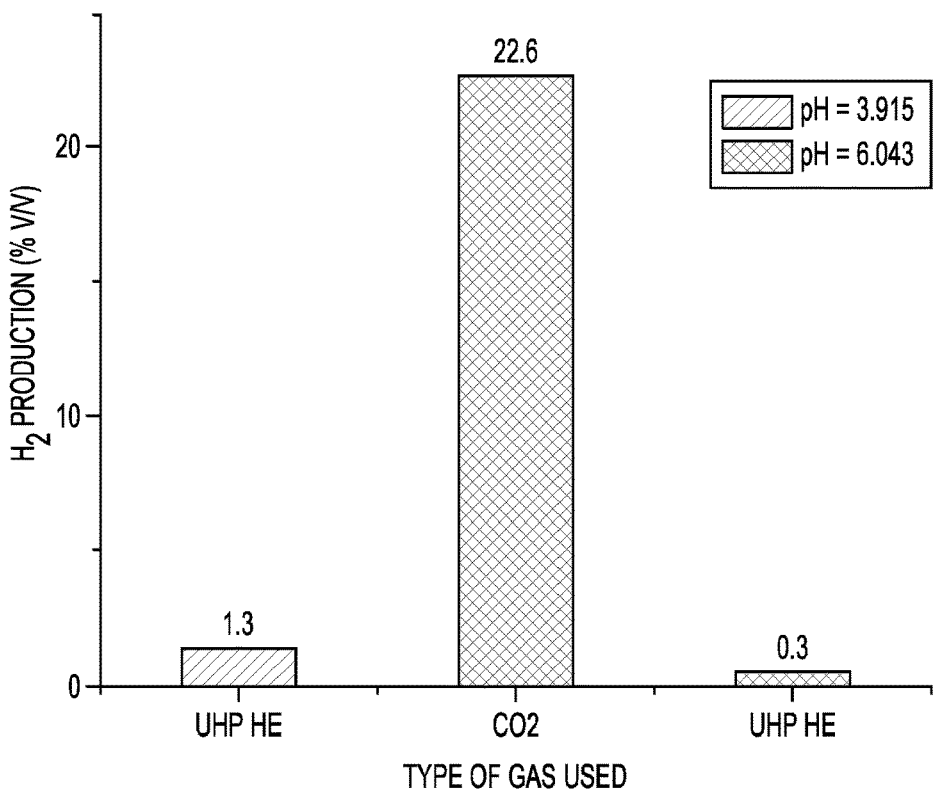
FIG. 3 is a graph showing amounts of $H_2$ produced with different gases at different pH values.

The amounts of produced hydrogen for each experimental condition are shown in FIG. 3. According to FIG. 3, it can be noted that the low pH without $CO_2$ does not produce high amounts of $H_2$ as when $CO_2$ is present in the system. Hence, the role of $CO_2$ in the system is not merely lowering the pH, but rather $CO_2$ is participating in the reaction as an active reactant or catalyst for the production of $H_2$.

Figure 4:
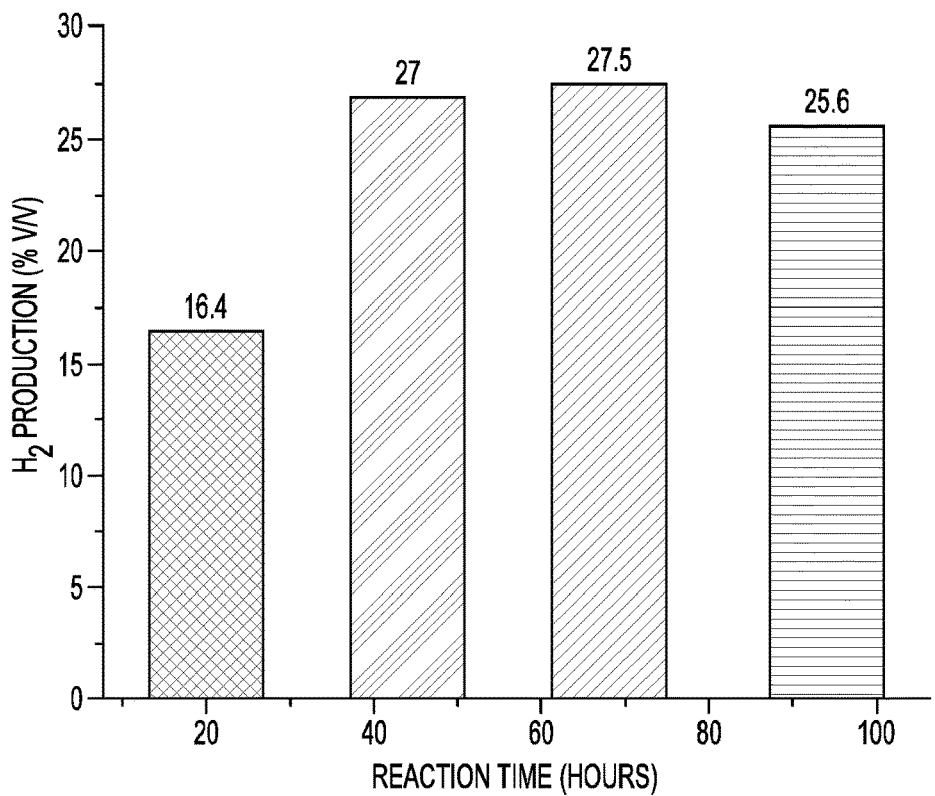
FIG. 4 is a graph showing amounts of produced $H_2$ at different reaction times.

The production of $H_2$ at 30.5% (V/V) in reactors was first observed with a 120 hours reaction time. Hence, the optimization of reaction time for the production of $H_2$ was crucial. Four different experiments were carried out at 20 h, 44 h, 68 h and 94 h time durations and the produced $H_2$ was measured for each experimental setup (FIG. 4). According to FIG. 4, the production of $H_2$ seems to reach a maximum around 27% (V/V) in 44 to 68 h timeframe. Hence, the production of $H_2$ was then optimized by changing the amount of base in the reaction medium.

Figure 5:
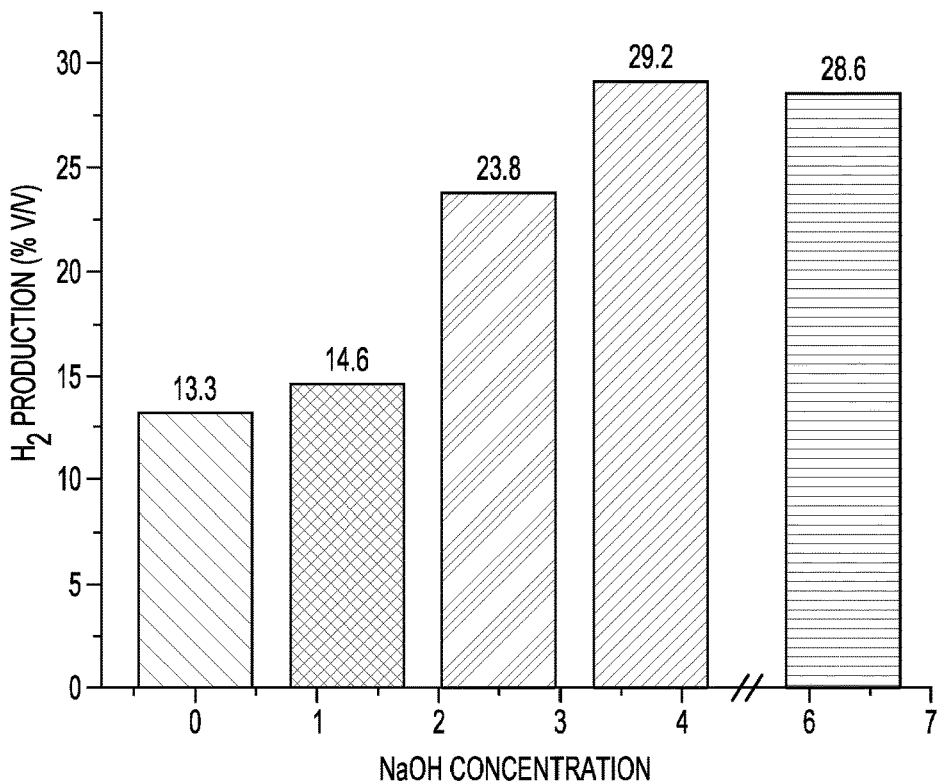
FIG. 5 is a graph showing amounts of produced $H_2$ at different NaOH concentrations.

It was noted above that lower pH did not favor the production of $H_2$ in the reactors over near neutral pH. The production of $H_2$ with basic pH was then tested since basic pH promotes the dissolution of acidic $CO_2$ and favors the formation of $CoCO_3$. Five experiments were carried out at different NaOH concentrations and the production of $H_2$ was monitored over 20 h (Table 3). Produced $H_2$ at each experimental condition is shown in FIG. 5.

TABLE 3

Experimental conditions used in the optimization of amount of base for the production of $H_2$.

| $CO_2$ Pressure | NaOH concentration | Amount of NaOH (μL) | Mass of catalyst (g) | Reaction time (hours) | Final temp (° C.) |
|---|---|---|---|---|---|
| 40 psi | 0 | — | 0.6120 | 20 | 101.1 |
| 40 psi | 1.25 | 700 | 0.6152 | 20 | 101.1 |
| 40 psi | 2.5 | 700 | 0.6159 | 20 | 101.1 |
| 40 psi | 3.75 | 700 | 0.6052 | 20 | 101.1 |
| 40 psi | 6.25 | 700 | 0.6190 | 20 | 101.1 |

According to the FIG. 5, it can be noticed that the highest amount of $H_2$ production was obtained with 3.75 M NaOH in 20 hours. Production of 27.5% (V/V) of $H_2$ at neutral pH took about 68 h of reaction time. Hence, the reaction time can be shortened by one third to obtain the same or even higher $H_2$ production with the introduction of a basic medium.

The decrease in the production of $H_2$ at higher NaOH concentrations (6.25 M) may be due to the dissolution of all the $CO_2$ in the reactor and lowering the pressure in the system. With previous experiments, it was demonstrated that elevated pressure was necessary for the production of $H_2$.

Example 3.3 Further Optimization of Reaction Parameters

In further examples hydrogen was produced using a system substantially in line with that described in Example 3.1. Reagents included cobalt, NaOH, and $CO_2$. The reagents were heated to a set temperature and the amount of hydrogen produced was determined. The amount of hydrogen produced by varying the temperature or reagent parameters was studied and the results are presented in the Tables 4-11 herein.

TABLE 4

Hydrogen production under optimized condition (using NaOH solution):

| Amount of cobalt | Concentration of NaOH | Volume of NaOH solution | Pressure of $CO_2$ supplied | Final Temperature | Percentage of $H_2$ |
|---|---|---|---|---|---|
| 2.7 g | 3M | 55 mL | 60 psi | 238 | 58.5% |
| 2.7 g | 3M | 55 mL | 70 psi | 237.7° C. | 68.8% |
| 2.7 g | 3M | 55 mL | 100 psi | 240 | 98.4%* |

*0.001452 ppm carbon monoxide was produced.

TABLE 5

Impact on $H_2$ production by changing the amount of cobalt

| Amount of cobalt | Concentration of NaOH | Volume of NaOH solution | Pressure of $CO_2$ supplied | Final Temperature | Percentage of $H_2$ |
|---|---|---|---|---|---|
| 2.7 g | 1M | 55 mL | 60 psi | 238 | 44% |
| 2 g | 1M | 55 mL | 60 psi | 239 | 32% |

TABLE 6

Impact on H$_2$ production by changing the NaOH concentration

| Amount of cobalt | Concentration of NaOH | Volume of NaOH solution | Pressure of CO$_2$ supplied | Final Temperature | Percentage of H$_2$ |
|---|---|---|---|---|---|
| 2.7 g | 1M | 55 mL | 60 psi | 238 | 44% |
| 2.7 g | 3M | 55 mL | 60 psi | 238 | 58% |

TABLE 7

Impact on H$_2$ production by changing the amount of water

| Amount of cobalt | Concentration of NaOH | Volume of NaOH solution | Pressure of CO$_2$ supplied | Final Temperature | Percentage of H$_2$ |
|---|---|---|---|---|---|
| 2.7 g | 3M | 18.5 mL | 60 psi | 237.8° C. | 16% |
| 2.7 g | 3M | 55 mL | 60 psi | 238 | 58% |

TABLE 8

Impact on H$_2$ production by changing the amount of water and keeping the same millimoles of NaOH (source of hydrogen is water):

| Amount of cobalt | Concentration of NaOH | Volume of NaOH solution | Pressure of CO$_2$ supplied | Final Temperature | Percentage of H$_2$ |
|---|---|---|---|---|---|
| 2.7 g | 1M | 55 mL | 60 psi | 238 | 44% |
| 2.7 g | 3M | 18.5 mL | 60 psi | 237.8° C. | 16% |

TABLE 9

Impact on H$_2$ production by changing the pressure of CO$_2$ supplied:

| Amount of cobalt | Concentration of NaOH | Volume of NaOH solution | Pressure of CO$_2$ supplied | Final Temperature | Percentage of H$_2$ |
|---|---|---|---|---|---|
| 2.7 g | 1M | 55 mL | 40 psi | 238 | 18% |
| 2.7 g | 1M | 55 mL | 50 psi | 238 | 33% |
| 2.7 g | 1M | 55 mL | 60 psi | 238 | 44% |

TABLE 10

Impact on H$_2$ production by changing the final temperature:

| Amount of cobalt | Concentration of NaOH | Volume of NaOH solution | Pressure of CO$_2$ supplied | Final Temperature | Percentage of H$_2$ |
|---|---|---|---|---|---|
| 2.7 g | 1M | 55 mL | 60 psi | 213 | 26% |
| 2.7 g | 1M | 55 mL | 60 psi | 238 | 44% |

TABLE 11

Optimization of final temperature:

| Amount of cobalt | Concentration of NaOH | Volume of NaOH solution | Pressure of CO$_2$ supplied | Final Temperature | Percentage of H$_2$ |
|---|---|---|---|---|---|
| 2.3 g | 1M | 40 mL | 40 psi | 195 | 9.4% |
| 2.3 g | 1M | 40 mL | 40 psi | 217 | 17% |
| 2.3 g | 1M | 40 mL | 40 psi | 226 | 18.37% |

Example 3.4 Further Optimization of Reaction Parameters

In further examples hydrogen was produced using a system substantially in line with that described in Example 3.1. Reagents included cobalt, NaOH, and Na$_2$CO$_3$. The reagents were heated to a set temperature and the amount of hydrogen produced was determined. The amount of hydrogen, CO, and CO$_2$ produced by varying the temperature or reagent parameters was studied and the results are presented in Table 12 herein.

TABLE 12

Hydrogen production using Na$_2$CO$_3$ solution (no CO$_2$ supplied):

| Amount of cobalt | Concentration of Na$_2$CO$_3$ | Volume of Na$_2$CO$_3$ solution | Pressure of CO$_2$ supplied | Final Temperature | Percentage of H$_2$ | Amount of CO$_2$ (ppm) | Amount of CO (ppm) |
|---|---|---|---|---|---|---|---|
| 2.7 g | 3M | 55 mL | 0 psi | 240° C. | 31.5% | 3860 | 2.7 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

ADDITIONAL EMBODIMENTS

The following exemplary embodiments are provided, the numbering of which is not to be construed as designating levels of importance:

Embodiment 1 provides a method of producing hydrogen, the method comprising:
heating a mixture comprising:
a metal component exhibiting a nanostructured surface,
water,
at least one of carbon dioxide and carbonate.

Embodiment 2 provides the method of producing hydrogen of Embodiment 1, further comprising contacting the metal component, the water, and the carbon dioxide.

Embodiment 3 provides the method of any one of Embodiments 1-2, wherein the metal component comprises an elemental metal or alloy thereof.

Embodiment 4 provides the method of Embodiment 3, wherein the elemental metal or alloy thereof ranges from about 1 wt % to about 100 wt % of the metal component.

Embodiment 5 provides the method of Embodiment 3, wherein the elemental metal or alloy thereof ranges from about 80 wt % to about 100 wt % of the metal component.

Embodiment 6 provides the method of Embodiment 3, wherein the elemental metal or alloy thereof comprises at least one of Co, Ti, Ru, Rh, Pd, Os, Ir, La, Ce, Fe, Cu, and Ni.

Embodiment 7 provides the method of Embodiment 6, wherein the elemental metal or alloy thereof is Co.

Embodiment 8 provides the method of Embodiment 7, wherein the Co is formed by reacting a cobalt salt with a reducing agent.

Embodiment 9 provides the method of Embodiment 8, wherein the cobalt salt is at least one of perchlorate, $CoCl_2$, $Co(NO_3)_2$, and $CoSO_4$.

Embodiment 10 provides the method of Embodiment 8, wherein the reducing agent is at least one of $N_2H_4$ and $NaBH_4$, sodium dithionite, sodium hypophosphite, lithium aluminum hydride, tin (II) salts, and hydrogen.

Embodiment 11 provides the method of any one of Embodiment 3-10, wherein the metal component is magnetic.

Embodiment 12 provides the method of any one of Embodiments 1-11, wherein a pH of the mixture is above 7.

Embodiment 13 provides the method of any one of Embodiments 1-12, wherein a pH of the mixture is above 9.

Embodiment 14 provides the method of any one of Embodiments 1-13, wherein the nanostructured surface comprises a plurality of features each independently having dimensions of about 1 nm to about 1,000 nm in length, about 1 nm to about 1,000 nm in height, and about 1 nm to about 1000 nm in thickness.

Embodiment 15 provides the method of any one of Embodiment 1-14, wherein the nanostructured surface of the metal component formed by a method free of acid etching, base etching, or laser etching.

Embodiment 16 provides the method of any one of Embodiment 1-15, wherein a pressure, in an environment of the mixture, ranges from about 0 psi to about 250 psi.

Embodiment 17 provides the method of any one of Embodiment 1-18, wherein the quantity of the metal component in the mixture ranges from about 0.01 wt % to about 60 wt % of the mixture.

Embodiment 18 provides the method of any one of Embodiment 1-17, wherein the quantity of the water of the mixture ranges from about 30 wt % to about 99 wt % of the mixture.

Embodiment 19 provides the method of any one of Embodiment 1-18, wherein a temperature of the reaction vessel is increased to about 350° C.

Embodiment 20 provides the method of Embodiment 19, wherein a temperature of the reaction vessel is increased from about 100° C. to about 200° C.

Embodiment 21 provides the method of any one of Embodiments 1-20, wherein the method is conducted in the substantial absence of light.

Embodiment 22 provides the method of any one of Embodiment 1-21, wherein a purity of the hydrogen produced ranges from about 20% (v/v) to about 99% (v/v).

Embodiment 23 provides the method of Embodiment 22, wherein a purity of the hydrogen produced is about 30% (v/v).

Embodiment 24 provides the method of Embodiment 22, wherein the purity of the hydrogen is greater than that of hydrogen produced according to a corresponding method wherein the metal component exhibiting a nanostructured surface in a reaction vessel is produced by acid etching, base etching, or laser etching.

Embodiment 25 provides the method of any one of Embodiments 1-24, wherein the metal component is elemental Co and the temperature of the reaction vessel is increased from about 119° C. to about 140° C.

Embodiment 26 provides the method of Embodiment 22, wherein the Co is formed by reacting $CoCl_2$ with $N_2H_4.H_2O$.

Embodiment 27 provides a kit for performing the method of any one of Embodiment 1-26, the kit comprising a mixture comprising:
the metal component exhibiting a nanostructured surface;
the quantity of water; and
the quantity of carbon dioxide.

Embodiment 28 provides the kit of Embodiment 27, wherein the mixture is sufficient to produce hydrogen upon an increase of a temperature of the kit.

Embodiment 29 provides the kit of Embodiment 28 wherein a purity of the hydrogen produced ranges from about 20% (v/v) to about 99% (v/v).

What is claimed is:

1. A method of producing hydrogen, the method comprising:
heating a mixture to produce hydrogen, the mixture comprising:
a synthesized metal component exhibiting a nanostructured surface comprising a plurality of features each independently having dimensions of about 1 nm to about 1,000 nm in length, about 1 nm to about 1,000 nm in height, and about 1 nm to about 1000 nm in thickness,
water, and
at least one of carbon dioxide and carbonate;
wherein the method is conducted in the substantial absence of light during the heating.

2. The method of producing hydrogen of claim 1, further comprising contacting the metal component, the water, and the carbon dioxide.

3. The method of claim 1, wherein the metal component comprises an elemental metal or alloy thereof.

4. The method of claim 3, wherein the elemental metal or alloy thereof ranges from about 1 wt % to about 100 wt % of the metal component.

5. The method of claim 3, wherein the elemental metal or alloy thereof comprises at least one of Co, Ti, Ru, Rh, Pd, Os, Ir, La, Ce, Fe, Cu, and Ni.

6. The method of claim 5, wherein the elemental metal or alloy thereof is Co.

7. The method of claim 6, wherein the Co is formed by reacting a cobalt salt with a reducing agent.

8. The method of claim 7, wherein the cobalt salt is at least one of perchlorate, chloride, nitrate and sulfate or Co$(ClO_4)_2$, $CoCl_2$, $Co(NO_3)_2$, and $CoSO_4$, respectively.

9. The method of claim 7, wherein the reducing agent is at least one of $N_2H_4$ and $NaBH_4$, sodium dithionite, sodium hypophosphite, lithium aluminum hydride, tin (II) salts, and hydrogen.

10. The method of claim 3, wherein the metal component is magnetic.

11. The method of claim 1, wherein a pH of the mixture is above 7.

12. The method of claim 1, wherein the nanostructured surface of the metal component is formed by a method free of acid etching, base etching, or laser etching.

13. The method of claim 1, wherein a pressure in an environment of the mixture ranges from about 0 psi to about 250 psi.

14. The method of claim 1, wherein the quantity of the metal component in the mixture ranges from about 0.01 wt % to about 60 wt % of the mixture.

15. The method of claim 1, wherein a temperature of a reaction vessel used to contain the mixture is increased to about 200° C. during the hydrogen production.

16. The method of claim 1, wherein a purity of the hydrogen produced ranges from about 20% (v/v) to about 99% (v/v).

17. A kit for performing the method of claim 1, the kit comprising a mixture comprising:

the metal component exhibiting the nanostructured surface and configured to produce the hydrogen when heated while in contact with water and carbon dioxide;

a quantity of water; and a quantity of carbon dioxide.

18. The kit of claim 17, wherein the mixture produces hydrogen upon an increase of a temperature, pressure or both of the kit.

19. The kit of claim 18 wherein a purity of the hydrogen produced ranges from about 20% (v/v) to about 99% (v/v).

* * * * *